(12) United States Patent
Bertolini et al.

(10) Patent No.: US 6,543,838 B1
(45) Date of Patent: Apr. 8, 2003

(54) VEHICLE DOOR PROVIDED WITH PELVIS THRUST MEANS

(75) Inventors: Carlo Bertolini, Feucherolles (FR); Thierry Pebre, Checy (FR); Laurent Arquevaux, Sully sur Loire (FR)

(73) Assignee: Meritor Light Vehicle Systems, Paris la Defense (FR)

( * ) Notice: Subject to any disclaimer, the term of this patent is extended or adjusted under 35 U.S.C. 154(b) by 0 days.

(21) Appl. No.: 09/004,482

(22) Filed: Jan. 8, 1998

(30) Foreign Application Priority Data

Jan. 8, 1997 (FR) .............................. 97 00117

(51) Int. Cl.[7] ................................. B60J 1/08
(52) U.S. Cl. ............................. 296/146.1; 296/146.6; 296/146.7; 280/751
(58) Field of Search .................. 296/146.1, 146.7, 296/153; 280/748, 751

(56) References Cited

U.S. PATENT DOCUMENTS

| | | | | |
|---|---|---|---|---|
| 3,808,743 A | * | 5/1974 | Renner et al. ............... | 296/153 |
| 3,989,275 A | * | 11/1976 | Finch et al. ................. | 280/751 |
| 4,272,103 A | * | 6/1981 | Schmid et al. .............. | 280/751 |
| 4,890,877 A | * | 1/1990 | Ashtiani-Zarandi et al. | 296/146 |
| 5,040,335 A | * | 8/1991 | Grimes ........................ | 296/146 |
| 5,048,234 A | * | 9/1991 | Lau et al. .................... | 296/146 |
| 5,102,163 A | * | 4/1992 | Ishikawa ..................... | 280/751 |
| 5,141,279 A | * | 8/1992 | Weller ......................... | 296/146 |
| 5,306,066 A | * | 4/1994 | Saathoff ................... | 296/146.6 |
| 5,356,177 A | * | 10/1994 | Weller ......................... | 280/751 |
| 5,395,135 A | * | 3/1995 | Lim et al. .................... | 280/751 |
| 5,435,619 A | * | 7/1995 | Nakae et al. ............. | 296/146.6 |
| 5,482,344 A | * | 1/1996 | Walker et al. ........... | 296/146.7 |
| 5,584,144 A | * | 12/1996 | Hisano ..................... | 296/146.7 |
| 5,749,600 A | * | 5/1998 | Yamada et al. ............. | 280/751 |
| 5,857,702 A | * | 1/1999 | Suga et al. .................. | 280/751 |
| 5,857,734 A | * | 1/1999 | Okamura et al. ........ | 296/146.6 |
| 5,865,496 A | * | 2/1999 | Odan et al. ............. | 296/146.6 |
| 5,906,072 A | * | 5/1999 | Feige et al. .............. | 296/146.7 |
| 5,906,409 A | * | 5/1999 | Derees et al. ............ | 296/146.7 |
| 5,934,730 A | * | 8/1999 | Yagishita et al. ........ | 296/146.7 |
| 6,036,251 A | * | 3/2000 | Yagishita et al. ........ | 296/146.6 |
| 6,192,632 B1 | * | 2/2001 | Medebach et al. ....... | 296/146.7 |
| 6,203,096 B1 | * | 3/2001 | Noda et al. .............. | 296/146.6 |
| 6,221,930 B1 | * | 4/2001 | Tada et al. ................. | 521/155 |
| 2001/0017476 A1 | * | 8/2001 | Nishikawa et al. ...... | 296/146.6 |

* cited by examiner

*Primary Examiner*—Kiran Patel
(74) *Attorney, Agent, or Firm*—Carlson, Gaskey & Olds

(57) ABSTRACT

Vehicle comprising a box structure (1) in an inner panel (2) of which there is provided an opening (3) for the passage of components, such as a window raiser mechanism (4), mounted on a support plate (5) shaped for being applied in a sealed manner against the periphery of the opening. The support plate of the components has a dishing region (9) situated at the level of the articulation joints R1, R2 of the hips of passengers so as to constitute a pelvis thrust member in the event of a lateral impact on the door. The dishing region (9) is press formed and comprises a group of bosses (11) orientated in the direction toward the window glass (10) and interconnected on the side adjacent to the passengers by planar areas (12) of the support plate.

20 Claims, 3 Drawing Sheets

VEHICLE DOOR PROVIDED WITH PELVIS THRUST MEANS

The present invention relates to a vehicle door of the type comprising a box structure in an inner panel of which there is provided an opening for the passage of components, such as a window raiser mechanism, which are mounted on a support plate so shaped as to be applied in a sealed manner on the periphery of the opening, said support plate constituting with said components a sealed module.

BACKGROUND OF THE INVENTION

In the event of a lateral collision, it is known to improve the safety of the passengers by causing a thrust to be exerted on the pelvis of the passengers in a manner compatible with the morphological characteristics as soon as possible upon impact. The object is to ensure that the contact between the passenger and the door does not occur at the level of the trunk which constitutes a region weaker than that of the pelvis of the passenger.

For this purpose, it is known to fill the interior of the door and the interior of the trim panel with a material whose behaviour is adapted to the compression. In this way, upon impact, the deformation of the outer skin of the door compresses the filling material. This compression is transmitted to the trim panel which consequently has a tendency to penetrate the passenger compartment right at the start of the deformation of the door. The trim panel comes in contact with the pelvis of the passenger and exerts a thrust thereon.

In order to avoid injuring the passenger the filling material must have a limited resistance to compression so that the resulting force is compatible with the resistance of the hip of a standard person; for example, this force must be less than the force exerted on the hip of a dummy tolerated by a pending European standard relating to lateral shocks or impacts.

It is also known to form a pelvis thrust structure by means of paddings of rigid foam or alveolate plastics material having a shape and density imparting thereto the desired resistance to compression, these paddings being disposed on both sides of the sheet metal forming the sealed module. These arrangements have a drawback in that they require at least two parts, namely the sheet metal support and a pad, and more commonly three parts, namely the sheet metal support and two pads disposed on opposite sides of the latter.

An object of the invention is to provide a vehicle door in which the pelvis thrust means is constructed in a more simple manner by reducing the number of parts required while retaining the same resistance to compression as the aforementioned known constructions.

SUMMARY OF INVENTION

According to the invention, the support plate of the components has a dishing region situated at the level of the articulation points of the hips of the passengers so as to constitute a pelvis thrust means in the event of a lateral impact on the door.

According to one embodiment of the invention, the dishing region is press formed and comprises a group of bosses oriented in the direction toward the window glass and interconnected by planar areas of the sheet on the side thereof adjacent to the passengers.

In this embodiment, the invention therefore permits achieving the pelvis thrust function without addition of any additional part to the sheet of the module.

In another embodiment of the invention, the dishing is formed by a local deformation of a sheet constituting the support plate and by fixing on the periphery of said deformation a press-formed second sheet having a profile complementary to said deformation of the first-mentioned sheet.

In this case a single part is added to the sheet to constitute the pelvis thrust means. This type of embodiment is easier to manufacture than that of the press-formed single sheet.

Further features and advantages of the invention will be apparent from the following description with reference to the accompanying drawings which illustrate two embodiments of the invention by way of non-limitative examples.

DETAILED DESCRIPTION OF THE INVENTION

Figure 1:
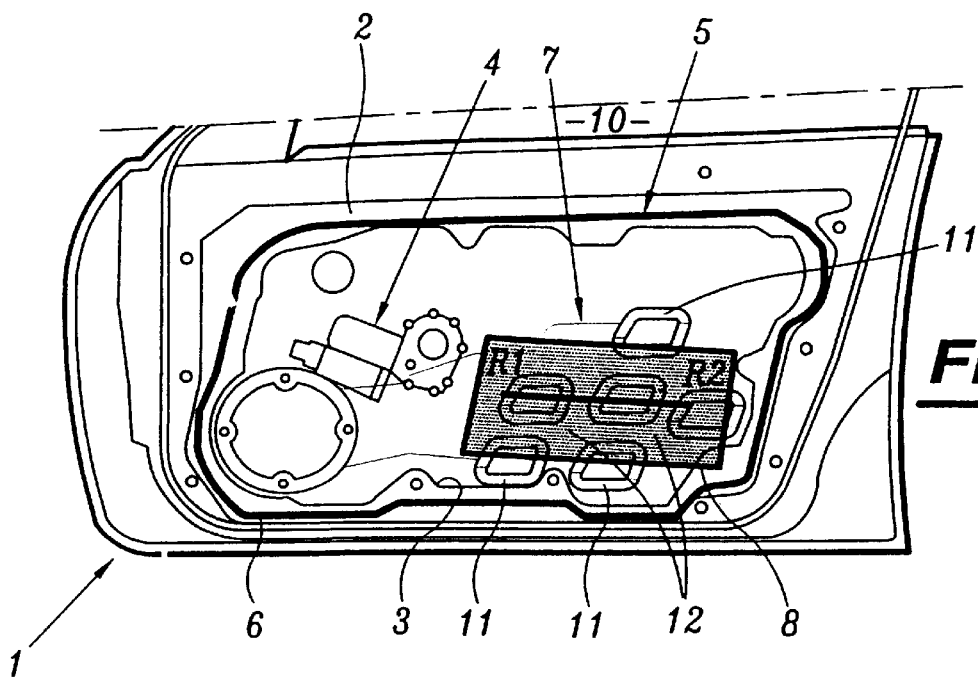
FIG. 1 is a partial elevational view to a small scale of a vehicle door whose inner trim panel has been removed to show the component support sheet constituting the sealed module.

The vehicle door illustrated in FIG. 1 comprises a box structure 1 in an inner panel 2 of which there is formed an opening 3 for the passage of various components such as in particular a window raiser mechanism 4 which is constructed in the known manner and need not be described.

These components are mounted in the known manner on a support plate 5 which is so shaped as to be applied in a sealed manner against the portion of the panel 2 defining the periphery of the opening 3 with the use of a peripheral sealing element 6.

With R1 being the articulation point of the hip of a person of small size and R2 the same articulation point of a person of large size, the sheet constituting the support plate 5 has, in the region of the articulation points R1 and R2 a dishing region arranged in such manner as to constitute thrust means 7 for the pelvis of the passengers in the event of a lateral impact on the door. There is consequently defined around R1 and R2 an approximately rectangular thrust surface 8 whose function is to absorb a lateral shock or impact and thereby improve the safety of the passenger.

Figure 2:
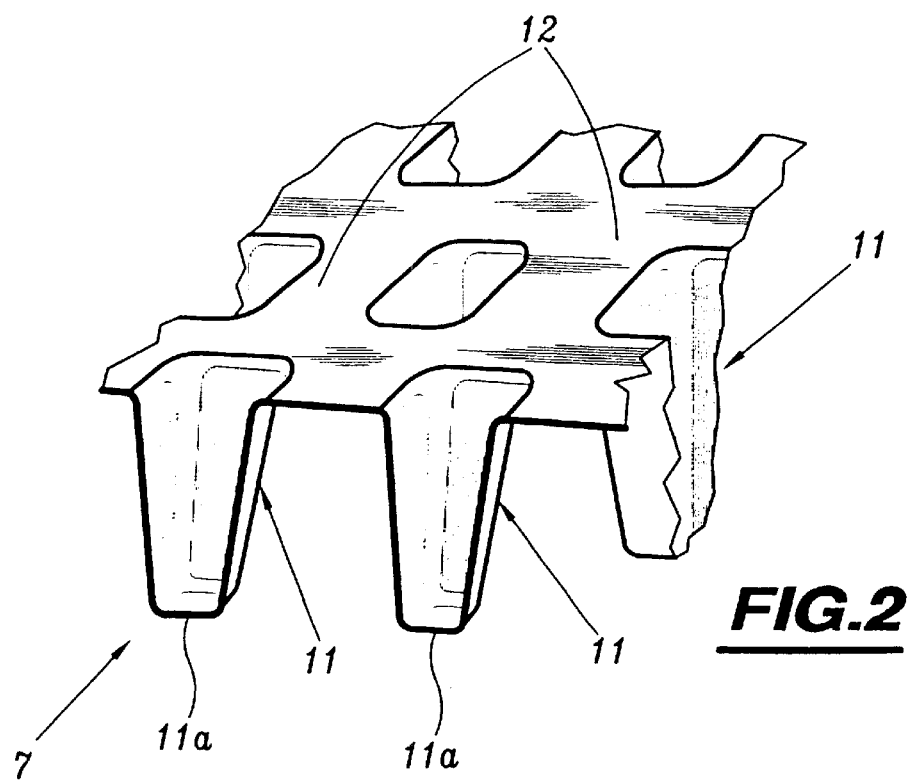
FIG. 2 is a partial perspective view to a small scale of a first embodiment of the pelvis thrust means produced in the sheet of the sealed module according to the invention.

According to a first embodiment of the thrust means 7 illustrated in FIGS. 1 and 2, the dishing region constituting the pelvis thrust means 7 comprises a group of bosses 11 oriented in the direction toward the window glass 10 and interconnected by areas 12 of the sheet on the side adjacent to the passengers (not shown). The bosses 11 have a truncated pyramidal shape whose large base is situated in the plane of the areas 12 and whose apex 11a is oriented in the direction toward the glass 10.

The press-formed plate 5 may be of any suitable metal or alloy such as steel, aluminum etc.

Figure 3:
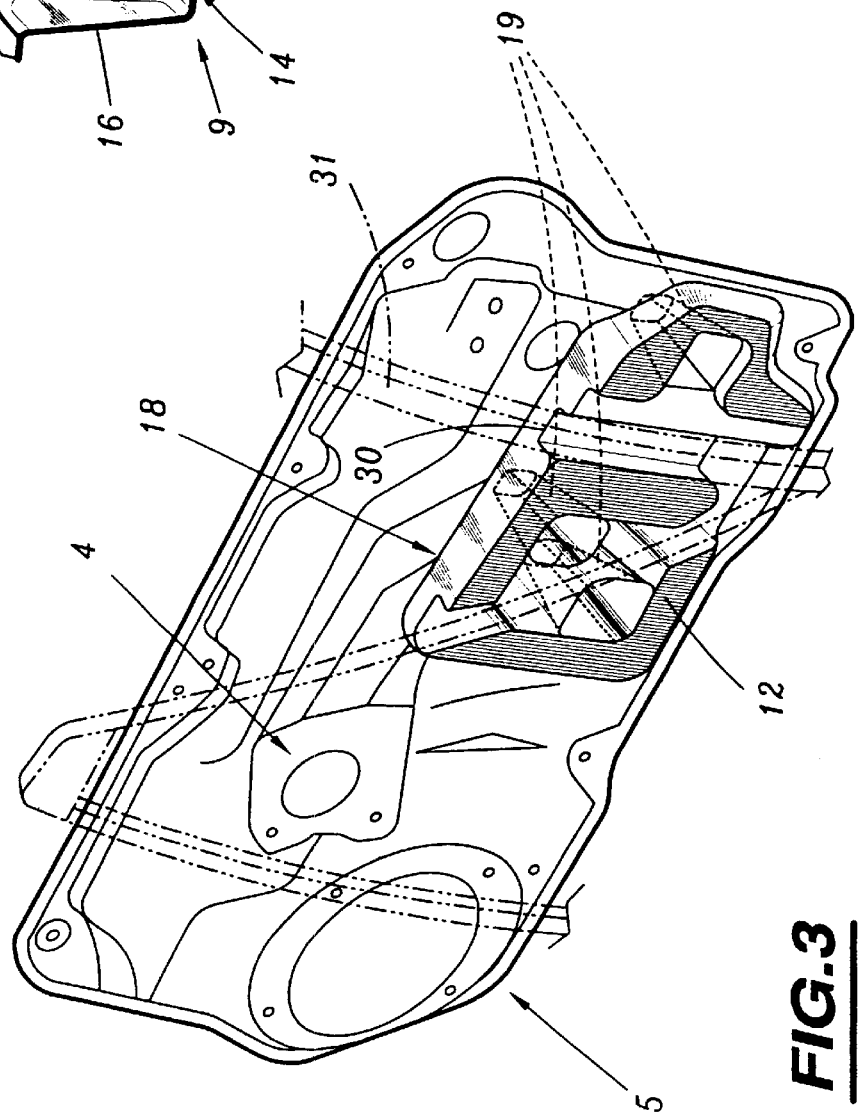
FIG. 3 is a simplified perspective view of a door provided with a pelvis thrust means according to an embodiment comparable to that of FIG. 2.

The second embodiment (FIG. 3) of the thrust means 18 comprises a plurality of bosses 19 in the shape of truncated pyramids and a passageway 30 press-formed in the late 5 for surrounding the driving cables 31 of the window raiser mechanism 4.

Figure 4:
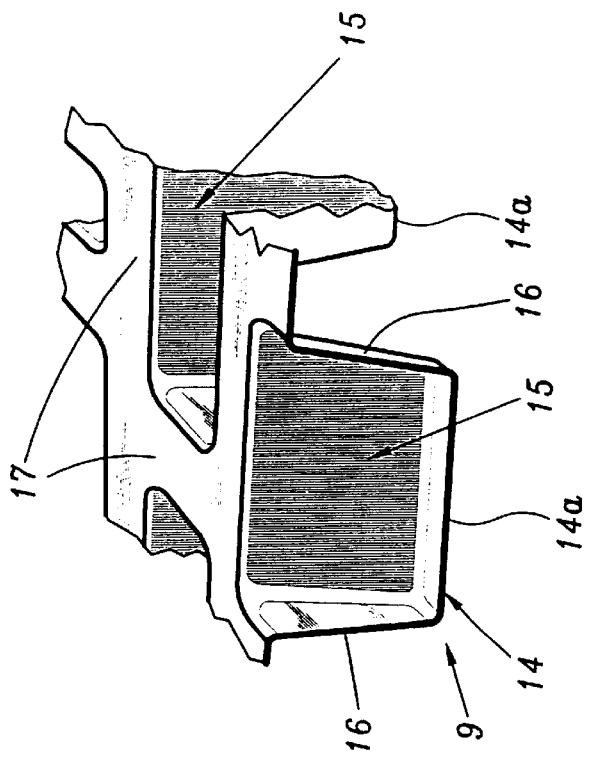
FIG. 4 is a partial perspective view of a third embodiment of the pelvis thrust means according to the invention.

In the third embodiment illustrated in FIG. 4, the dishing region 9 is formed by a group of bosses 14 having a trapezoidal profile with two large sides 15 and two small sides 16. Each boss 14 is oriented towards the window glass 10 and the bases of the bosses 14 are interconnected on the side adjacent to the passengers by planar areas 17.

In the event of a lateral impact, the apices 14a of the bosses 14 are subjected to this impact and are deformed and the planar areas 17 are urged against the pelvis of the passenger.

Figure 5:
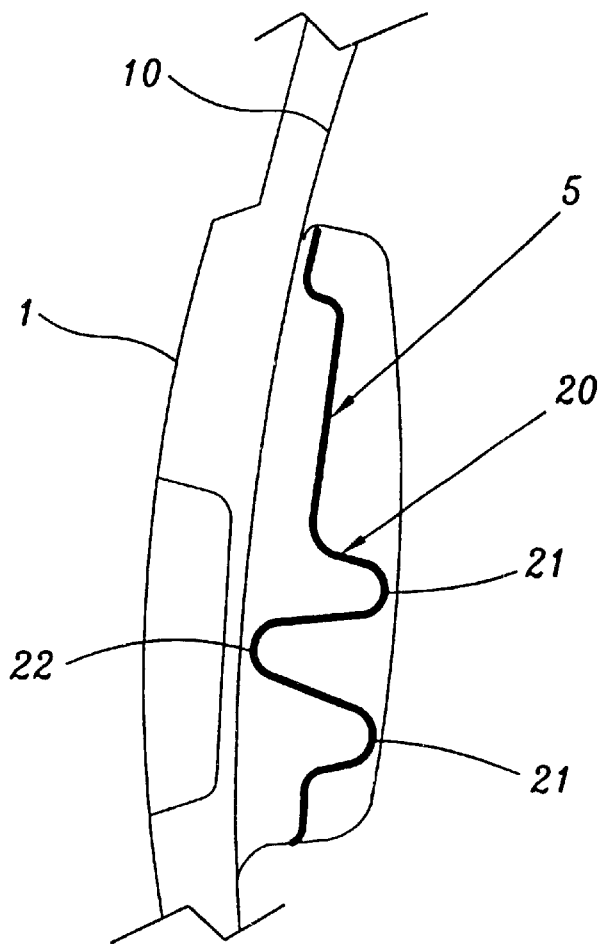
FIG. 5 is a simplified transverse elevational view of a second embodiment of the invention in which the dishing region is formed by a group of press-formed bosses oriented alternately in the direction toward the window glass and in the direction toward the pelvis of the passengers.

In the fourth embodiment (FIG. 5), the thrust means 20 of the plate sheet 5 is formed by a group of press-formed bosses 21,22 alternately oriented in the direction toward the glass 10 and toward the articulation points R1 and R2 of the pelvis of the passenger.

Figure 6:
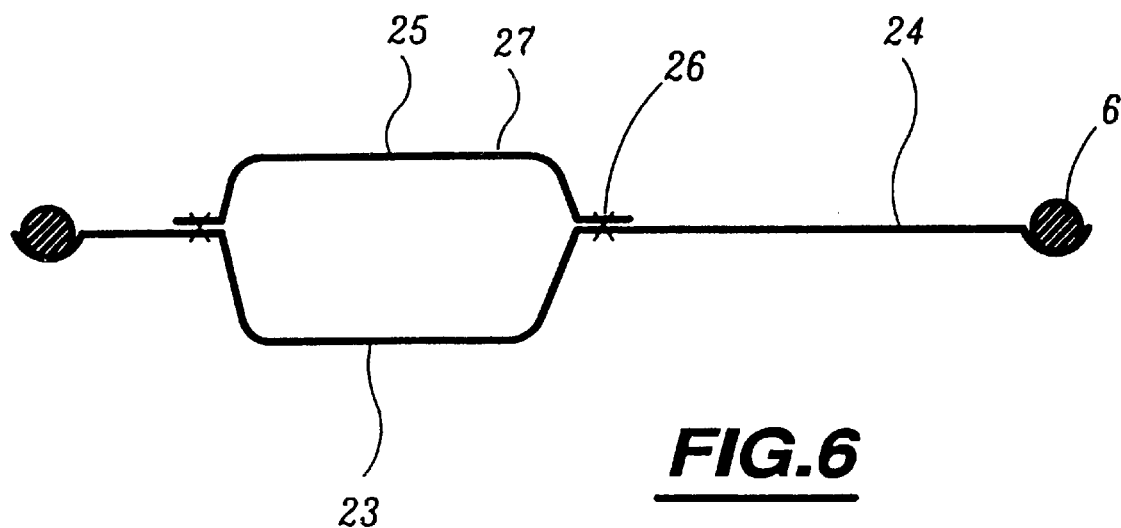
FIG. 6 is a diagrammatic top plan view of another embodiment of the door according to the invention.

In the embodiment diagrammatically represented in FIG. 6, the dishing region of the sheet 24 of the sealed module is formed by a local deformation 23 of the sheet 24 and by fixing on sheet 24 around the periphery of this deformation 23 a second press-formed sheet 25 having a shaped portion 27. The latter may have a complementary profile advantageously symmetrical to that of the deformation 23 of the first sheet to which it may be fixed by any suitable means, such as welding on its periphery 26. The two shaped portions 23, 27 define a region forming the pelvis thrust means which therefore comprises two parts in this embodiment.

In these various embodiments, the pelvis thrust means of the support sheet of the components of the sealed module is produced in a more simple and rapid manner than in the prior art with no additional part or with the addition of a single part (FIG. 6). In any case, the pelvis thrust means is integrated with the component support sheet.

What is claimed is:

1. Vehicle door comprising in combination: a box structure having an inner panel and an opening provided in said inner panel for the passage of window components, a support plate on which said components are mounted and which is so shaped as to be applied in a sealed manner against a portion of said panel defining the periphery of said opening, said support plate comprising a dishing region situated at the level of the articulation joints of the hips of passengers so as to constitute a pelvis thrust means in the event of a lateral impact on said door.

2. Door according to claim 1, wherein said dishing region is press formed and comprises a group of bosses having distal ends extending in a direction toward window glass of said door and interconnected by planar areas of said support plate on the side thereof adjacent to the passengers.

3. Door according to claim 1, wherein said dishing region is press formed and comprises a group of bosses oriented alternately in a direction toward the window glass of said door and in a direction toward the pelvis of the passengers.

4. Door according to claim 1, wherein said dishing region is produced by a local deformation of a first sheet constituting said support plate and by a press-formed second sheet fixed on the periphery of said deformation, said second sheet having a profile complementary to said local deformation.

5. Door according to claim 4, wherein said press-formed second sheet is symmetrical to said local deformation of said first sheet.

6. Door according to claim 4, wherein said press-formed second sheet is fixed by welding to said local deformation of said first sheet.

7. Door according to claim 5, wherein said press-formed second sheet is fixed by welding to said local deformation of said first sheet.

8. A vehicle door assembly comprising:

a box structure having an inner panel and an opening provided in said inner panel for the passage of door components;

a support plate on which said door components are mounted, said support plate being in engagement against a portion of said inner panel that defines the periphery of said opening, and a dishing region formed within said support plate at a location corresponding to a hip articulation point of a passenger, said dishing region including at least one deformable thrust member that deforms in response to a lateral impact force on a vehicle door to direct thrust loads toward said hip articulation point.

9. An assembly according to claim 8 including a peripheral sealing element for sealing said support plate against the periphery of said opening.

10. An assembly according to claim 8 wherein said door components include a window raiser mechanism.

11. An assembly according to claim 8 wherein said dishing region is defined by a rectangular thrust surface.

12. An assembly according to claim 11 wherein said rectangular thrust surface is further defined by a first hip articulation point for a small person and a second hip articulation point for a large person.

13. An assembly according to claim 8 wherein said at least one deformable thrust member includes a plurality of bosses having a base extending to an apex.

14. An assembly according to claim 13 wherein said bosses have a truncated pyramidal shape with said apex extending toward a door window, said bases being interconnected by areas that face the passenger.

15. An assembly according to claim 13 including at least one passageway formed within said support plate for surrounding driving cables for said door components.

16. An assembly according to claim 13 wherein said bosses have a trapezoidal profile with said apex extending toward a door window and with said bases being interconnected by areas that face the passenger.

17. An assembly according to claim 16 wherein said apices of said bosses are deformable in response to said impact force and deform with said areas being urged toward said hip articulation point.

18. An assembly according to claim 17 wherein said bosses are orientated alternately in a direction toward a window of the door and in a direction toward said hip articulation point.

19. An assembly according to claim 8 wherein said at least one deformable thrust member comprises a first sheet having a local deformation and a second sheet having a deformed portion wherein said second sheet is fixed to said first sheet around the periphery of said local deformation.

20. An assembly according to claim 19 wherein said local deformation has a first profile and said deformed portion has a second profile that is symmetrical to said first profile.

* * * * *